United States Patent Office 2,768,880
Patented Oct. 30, 1956

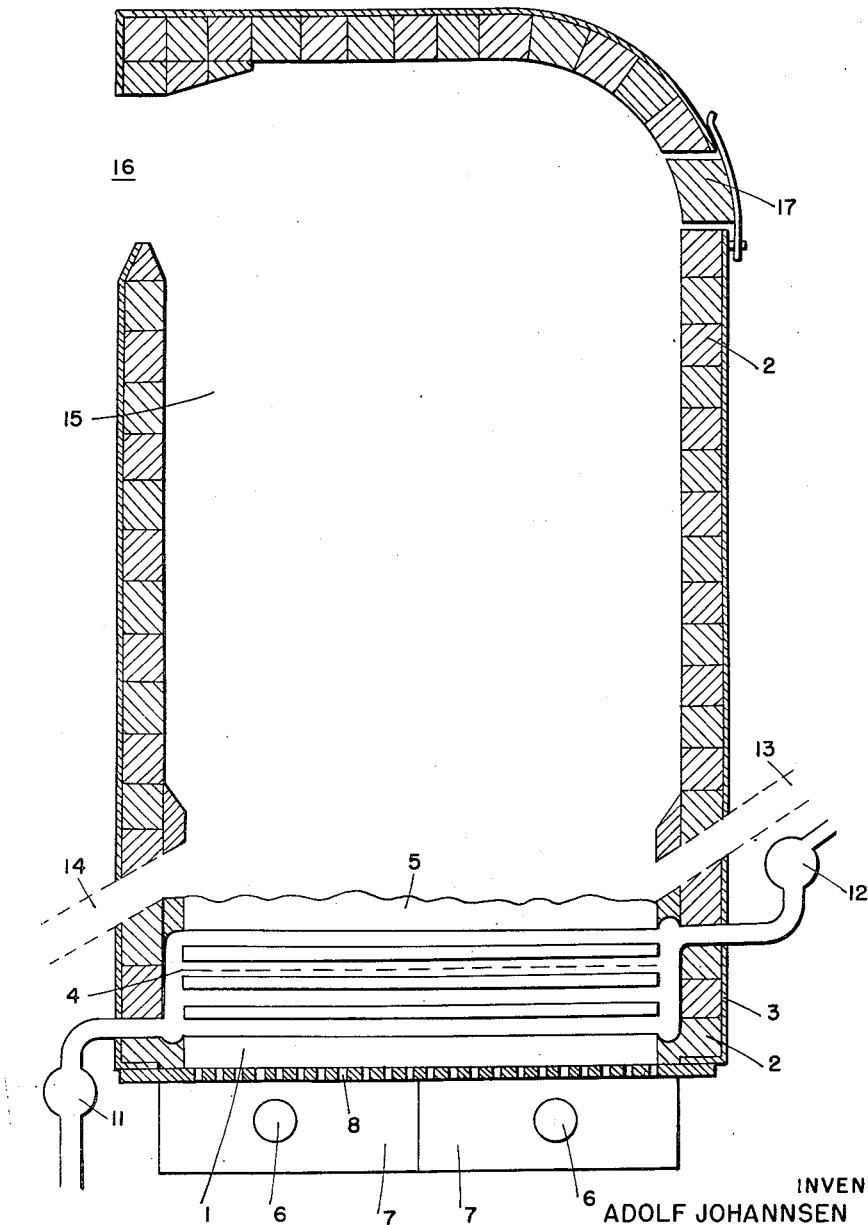

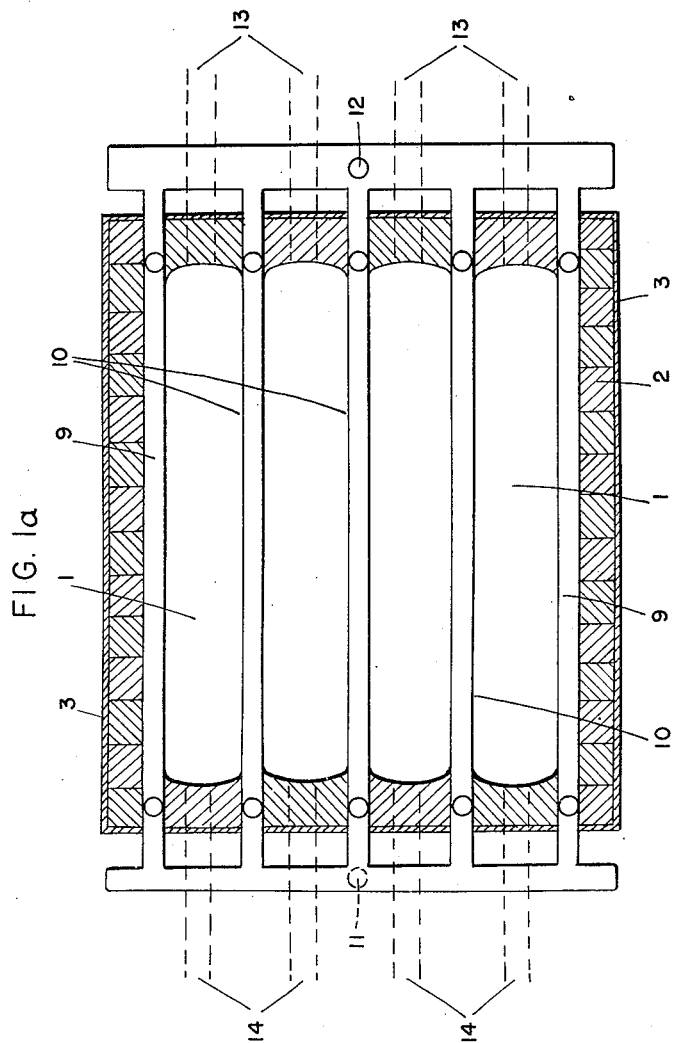

2,768,880

APPARATUS FOR THE PRODUCTION OF GASES CONTAINING SULFUR DIOXIDE BY ROASTING

Adolf Johannsen, Ludwigshafen (Rhine), Friedrich Hettler, Bad Duerkheim, and Ferdinand Lampe and Herbert Wolf, Ludwigshafen (Rhine), Germany, assignors to Badische Anilin- & Soda-Fabrik Aktiengesellschaft, Ludwigshafen (Rhine), Germany Application April 23, 1952, Serial No. 283,864

Claims priority, application Germany July 3, 1951

5 Claims. (Cl. 23—277)

This invention relates to improved apparatus for the production of gases containing sulfur dioxide by roasting.

The object of this invention is to provide apparatus for the production of gases containing sulfur dioxide by roasting comminuted iron pyrites and similar minerals and materials containing roastable sulfur in a layer of substantially roasted material which is kept in random turbulent motion by means of the oxygen-containing gases necessary for the roasting and the reaction gases formed by the strongly exothermic reaction, heat being withdrawn from the reaction layer by radiation and by convection and the heat utilized. In turbulent layers consisting predominantly of roasted ore of a grain size between 0.1 and 4 millimetres we are able, at roasting temperatures of 850° C., to obtain heat transfer values of 300 kilogram calories per square metre per hour per ° C. through wrought iron exchange surfaces into flowing or vaporizing water.

We have already proposed to effect the withdrawal of heat by heat-absorbing members which are arranged at the lateral boundary surfaces of the turbulent layer. In the case of systems in which there is a great distance between the boundary surfaces it is recommended that additional heat-exchanging members should be arranged in the interior of the turbulent layer. In this latter arrangement account must be taken of the drawback that the free accessibility to the turbulent layer is hindered by the heat-absorbing members distributed in the interior of the turbulent layer.

We have now found that an arrangement which is especially suitable for large systems is obtained by combining single systems having heat-absorbing members arranged at their boundary surfaces to an aggregate in such mannner that the heat-absorbing members also partly serve at the same time as separating walls between the single systems. For example several small systems with roasting surfaces extending preferably in one dimension, as for example rectangular roasting surfaces, at the lateral vertical boundary surfaces of which, in particular at the long sides of the rectangular grate, are arranged the heat-exchanging members, may be built together to an aggregate in such a way that the heat-exchanging members arranged above the long sides of the roasting surface serve at the same time as separating walls between the single systems. The distances apart of the two separating walls between the individual systems can be chosen so that the roasting surface remains accessible from above over its entire surface. The individual systems may be fed from one or more common wind chambers or may be provided with separate wind chambers. The supply of material to be roasted and the withdrawal of the roasted ore is preferably effected separately for each individual system. By providing orifices in the separating walls, however, a combination of the individual systems with each other can be achieved. Instead of individual systems having rectangular cross-section, it is also possible to combine individual systems having, for example, sector-shaped cross-section to an annular aggregate in a corresponding manner. The common separating walls of the sector-shaped individual systems then serve at the same time as heat-absorbing members.

The invention will now be further described with reference to the accompanying drawings in which Figure 1 is a sectional elevation of an apparatus according to the invention and Figure 1a is a sectional plan of the apparatus of Figure 1.

The apparatus is an aggregate of a plurality of individual systems having roasting surfaces of elongated rectangular shape in which the heat-exchanging members are constructed at the same time as separating walls between the partial systems. A turbulent layer 1 is situated within an iron vessel 3 of rectangular cross-section provided with refractory brickwork 2. The broken line 4 represents the surface of the layer in the quiescent state, while the undulating line 5 represents the surface of the expanded turbulent layer. The oxygen-containing gas enters through openings 6 into a subdivided wind chamber 7 and thence through a grate 8 into the layer 1. At the longitudinal walls registers of steam tubes 9 are arranged vertically one above the other and these cover the entire wall surface up to the height of the expanded turbulent layer. Similar steam tube registers 10 are also provided as separating walls between the individual systems in uniform horizontal spacing. As may be seen from Figure 1, sufficient vertical spaces are left between the single tubes to permit a communication of the turbulent layer over its entire cross-section. A larger gap is left above and below the steam tube registers 10 in order that a uniform formation of the turbulent motion over the entire cross-section of the layer is not impaired. Water under pressure is circulated through the parallel-connected steam tube registers by way of the header 11 by means of a circulating pump (not shown). The mixture of steam and water formed in the steam tubes is supplied through the collecting tube 12 to a steam drum (not shown) and the hot water under pressure separated from the steam therein is supplied in circulation again to the header 11 by the circulating pump after the addition of boiler feed water. The steam tube registers can be withdrawn from the system in a longitudinal direction after detaching the header 11 and the collecting tube 12. Their distance apart is preferably chosen so that each individual system is accessible between two registers.

The material to be roasted is fed separately to each of the individual systems formed by the steam tube registers through tubes 13 indicated by broken lines, a common plate distributor with a corresponding number of strippers preferably being used. The roasted material is withdrawn through pipes 14 indicated by broken lines. 15 is the common quiescent zone above the turbulent layer, 16 is the opening through which the roaster gases pass into the adjacent waste heat boiler and 17 is one of the working openings arranged at different heights.

In apparatus of the said kind it is possible to roast, for example, a sulfidic mixed mineral containing, besides pyrites, about 12% of zinc blende and 41% of sulfur and having a grain size up to 4 millimetres, continuously in a turbulent layer consisting predominantly of substantially roasted material of a height of about 50 centimetres (in the quiescent state) with an hourly throughput of 0.9 metric ton of pyrites per square metre. The temperature is kept at about 950° C. by withdrawing the excess roasting heat by producing steam at 20 to 45 atmospheres in the manner described. Roasted ore having a sulfur content of less than 1.5% (mainly as sulfate sulfur) is obtained. The sulfur dioxide content of the roaster gas is 15% and the oxygen content about 1%. The sensible heat of the roaster gases is also used for steam production.

The heat-absorbing members are preferably sheathed with erosion- and heat-stable cast iron or covered with other erosion- and heat-stable materials.

What we claim is:

1. In apparatus for the production of gases containing sulfur dioxide by roasting comminuted sulfur-containing materials in a layer of substantially roasted material kept in random turbulent motion by means of the oxygen-containing gas necessary for the roasting and by means of the reaction gases formed in the strongly exothermic reaction, the combination which comprises a roasting furnace containing a plurality of vertically arranged roasting compartments adjacent each other at common upwardly extending surfaces, heat-absorbing members positioned at inner walls of said furnace, additional heat-absorbing members positioned at the said surfaces common to adjacent said compartments and providing vertical separating walls separating said compartments at least in part, said compartments being dimensioned to provide a substantial horizontal distance between said heat-absorbing members forming the boundaries of each said compartment so that the roasting spaces in said compartments are accessible from above to the lower ends of said compartments, means for introducing fresh sulfur-containing materials separately to each said compartment, and means for withdrawing roasted material separately from each said compartment.

2. In apparatus for the production of gases containing sulfur dioxide by roasting comminuted sulfur-containing materials in a layer of substantially roasted material kept in random turbulent motion by means of the oxygen-containing gas necessary for the roasting and by means of the reaction gases formed in the strongly exothermic reaction, the combination which comprises a roasting furnace containing a plurality of vertically arranged roasting compartments adjacent each other at common upwardly extending surfaces, said compartments being bounded by heat-absorbing members which serve as vertical separating walls separating the compartments at least in part, said walls being spaced apart a substantial distance so that the roasting spaces in said compartments are accessible from above to the lower ends of said compartments.

3. In apparatus for the production of gases containing sulfur dioxide by roasting comminuted sulfur-containing materials in a layer of substantially roasted material kept in random turbulent motion by means of the oxygen-containing gas necessary for the roasting and by means of the reaction gases formed in the strongly exothermic reaction, the combination which comprises a roasting furnace containing a plurality of vertically arranged roasting compartments adjacent each other at common upwardly extending surfaces, said compartments being bounded by heat-absorbing members which serve as vertical separating walls separating the compartments at least in part, said walls being spaced apart a substantial distance so that the roasting spaces in said compartments are accessible from above to the lower ends of said compartments, each of said walls being a register of said heat-absorbing members positioned substantially horizontally and arranged vertically one above another, the roasting surfaces of said compartments extending in one dimension, said registers being arranged longitudinally of said compartments.

4. In apparatus for the production of gases containing sulfur dioxide by roasting comminuted sulfur-containing materials in a layer of substantially roasted material kept in random turbulent motion by means of the oxygen-containing gas necessary for the roasting and by means of the reaction gases formed in the strongly exothermic reaction, the combination which comprises a roasting furnace containing a plurality of vertically arranged roasting compartments adjacent each other at common upwardly extending surfaces, said compartments being bounded by heat-absorbing members which serve as vertical separating walls separating the compartments at least in part, said walls being spaced apart a substantial distance so that the roasting spaces in said compartments are accessible from above to the lower ends of said compartments, each of said walls being a register of said heat-absorbing members positioned substantially horizontally and arranged vertically one above another, the roasting surfaces of said compartments extending in one dimension, said registers being arranged longitudinally of said compartments, said heat-absorbing members being spaced vertically from adjacent members and from said lower ends of said compartments for uniform formation of a turbulent layer over the entire cross-section of said furnace.

5. In combination in apparatus as defined in claim 1, a wind chamber below said compartments arranged for supplying said compartments in common with an oxygen-containing gas, said furnace being constructed to provide a common quiescent zone above said compartment.

References Cited in the file of this patent

UNITED STATES PATENTS

| 1,972,937 | Jaeger | Sept. 11, 1934 |
| 2,389,133 | Brassert et al. | Nov. 20, 1945 |
| 2,404,944 | Brassert | July 30, 1946 |
| 2,506,542 | Caldwell et al. | May 2, 1950 |
| 2,529,366 | Bauer | Nov. 7, 1950 |
| 2,596,580 | McKoy et al. | May 13, 1952 |
| 2,697,653 | Nicholson | Dec. 21, 1954 |